T. J. LINDSAY.
WORM DRIVE AXLE STRUCTURE.
APPLICATION FILED JULY 5, 1917.
Reissued Nov. 27, 1917.
14,398.
2 SHEETS—SHEET 1.
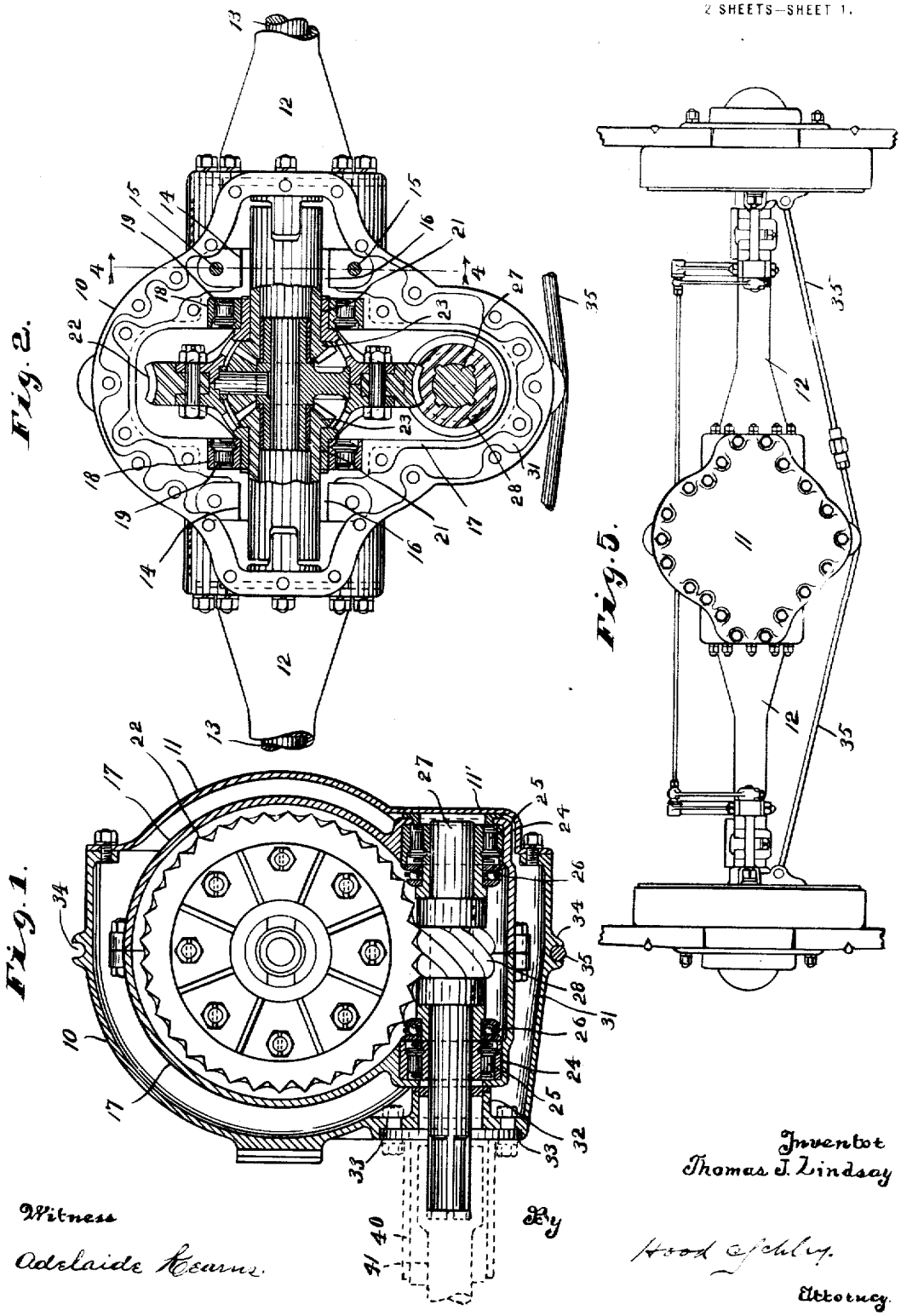
Witness
Adelaide Kearns.
Inventor
Thomas J. Lindsay
By
Hood & Schley.
Attorney.

T. J. LINDSAY.

WORM DRIVE AXLE STRUCTURE.

APPLICATION FILED JULY 5, 1917.

Reissued Nov. 27, 1917.

14,398.

2 SHEETS—SHEET 2.

Inventor
Thomas J. Lindsay

Witness
Adelaide Hearns

By Hoon C. Schley.
Attorney

UNITED STATES PATENT OFFICE.

THOMAS J. LINDSAY, OF INDIANAPOLIS, INDIANA, ASSIGNOR TO LINDSAY AUTO PARTS COMPANY, A CORPORATION OF INDIANA.

WORM-DRIVE AXLE STRUCTURE.

14,398. Specification of Reissued Letters Patent. Reissued Nov. 27, 1917.

Original No. 1,036,660. dated August 27, 1912, Serial No. 684,575, filed March 18, 1912. Application for reissue filed July 5, 1917. Serial No. 179,647.

*To all whom it may concern:*

Be it known that I, THOMAS J. LINDSAY, a citizen of the United States, residing at Indianapolis, in the county of Marion and State of Indiana, have invented a new and useful Worm-Drive Axle Structure, of which the following is a specification.

The object of my invention is to produce a convenient and economical power transmission unit for driving axle structures for automobiles, comprising a differential gearing or compensator, a driving worm, and an inclosing casing structure, the arrangement being such that the unit may be readily assembled and adjusted on a bench and then embodied in an axle structure with the driving worm arranged either above or below the compensator.

One of the chief objects of my invention is to provide a worm drive axle structure having a differential driving unit, including differential gearing, a drive shaft, and worm gearing connecting said drive shaft and said differential gearing, which differential driving unit is so mounted with reference to the axle housing that it is readily accessible and removable so that this unit may be removed from the axle structure for the purposes of adjustment, replacement or inspection without disconnecting the axle structure from the vehicle frame to which it is connected.

Figure 4:
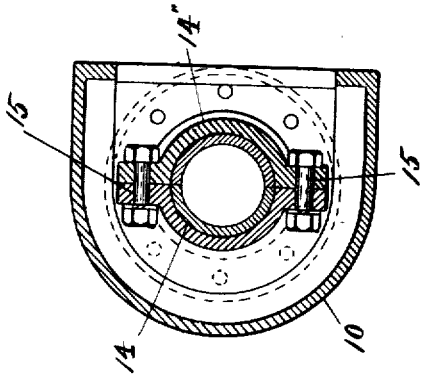
Figure 3:
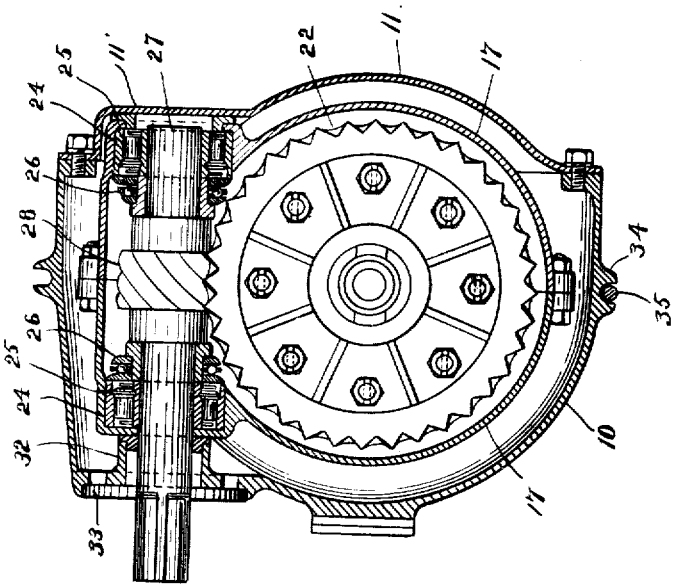

The accompanying drawings illustrate my invention. Figure 1 is a transverse section of the complete unit; Fig. 2 an elevation, with the cover of the casing removed, and the differential gearing in section, and with fragments of coöperating shaft units in place; Fig. 3 a section similar to Fig. 1, but with the driving worm above the differential gearing; Fig. 4 a section on line 4—4 of Fig. 2; and Fig. 5 an elevation, on a smaller scale.

In the drawings, 10 indicates a central casing member having a readily removable cap or cover 11. This central casing member 10 is formed, at axially opposite portions, so as to receive oppositely extending tubular shaft-carrying casing members 12, 12, in each of which is rotatably mounted a shaft section 13, as fully set forth in my Patent No. 1,097,653 issued May 19, 1914.

In the central casing member 10 I form two seats or pockets 14, 14 each of which is complemented by a cap 14″ detachably secured in place by bolts 15. The pockets 14, 14 are formed to receive the hubs 16, 16 of a cage which is formed by two mating members 17, 17. Cage 17—17 is provided with two alined pockets 18, 18 in each of which is mounted a roller bearing 19.

The main body of the compensator or differential gearing is formed with two oppositely extending trunnions 21, 21, which are supported by the bearings 19, and the said main body carries a main worm gear 22. The center gears 23, 23 of the differential gearing have a non-rotative, axially and transversely separable, connection with the adjacent ends of the shafts 13.

The two cage members 17, 17 are preferably similar and each is provided with an open-bottom bearing-pocket 24. These bearing pockets are formed in a lateral extension of the cage and are in alinement, with their common axis at right angles to and laterally offset from the axis of the casing 10—12 and of the trunnions 21, and said pockets are on opposite sides of the plane which contains said casing axis and is perpendicular to the axis of said bearing pockets. Each of the pockets 24 receives a roller bearing 25, and arranged against the inner end of each pocket is a thrust bearing 26. Mounted in the bearings 25 and projected through the bearings 26 and across the aforesaid plane is a driving shaft 27 co-axial with said pockets; and splined upon this shaft, between the thrust bearings 26, is a driven worm 28 which meshes with the worm-wheel 22 in such plane.

The central casing member 10 is formed with a transverse pocket 31, into which the pockets 24 of the cage 17 project, and this portion of the cage 17 is held between an inwardly projecting flange 32 of the casing member 10, and the part 11′ of cover 11. At 33 the casing 10 is formed to receive the rear end of a torque tube 40 which may house a main power or propeller shaft 41 connected, by an axially separable joint, with the shaft 27.

The casing member 10 is provided, top and bottom, with a crotch 34 for the reception of the usual brace rod 35 the ends of which are to be connected in a suitable manner to joints near the outer ends of the tubular casing members 12, as in the manner shown in my above mentioned patent.

In assembling the various parts of my device, worm wheel 22 may be arranged to take the thrust in either direction by merely reversing the cage, end for end, in the casing. The worm 28 may also be readily reversed on shaft 27.

If an under drive is desired the casing member 10 will be arranged as shown in Fig. 1, while if an over drive is desired, in order to give greater road clearance, the casing member 10 may be turned end for end relative to the tubular casing members 12 and then swung 180° into the position shown in Fig. 3.

By removing cover 11 and caps 14′, the unit—consisting of the cage 17, the differential gearing, and the driving worm and its shaft and bearings—may be bodily withdrawn from the casing member 10 without disturbing the adjustment of any of the bearings and without disconnecting the torque tube from the casing member of the driving axle structure.

It will be observed that I can remove the differential driving unit from the axle housing without disconnecting the axle structure from the vehicle to which it is attached. To do this, I, first, remove the cap or cover 11, as indicated above, and I then remove the caps 14″ which hold the hubs 16 of the cage in the seats or pockets 14. The shaft sections 13 are turned until they are lined up, as indicated in Fig. 2, and the differential driving unit can then be removed bodily by a lateral movement through the rearwardly facing opening closed by cover 11. The axially separable connection between the drive shaft 27 and the propeller shaft 41 permits of this movement without disconnecting the torque tube 40 and the bodily removal of the differential driving unit can be accomplished without disconnecting the axle structure from the vehicle frame. It will be seen that this bodily removal of the differential driving unit does not affect or disturb any of the bearing adjustments and the bearings can be adjusted when the cage containing the differential driving unit is placed on a convenient work bench. The parts going to make up this driving unit can be disassembled by separating the mating members 17 forming the cage.

All of the bearings of the differential gearing, and the driving worm and shaft may be adjusted accurately with the cage 17—17 on a convenient bench and then the unit placed securely within the casing member 10 without the necessity of any readjustment.

I claim as my invention:

1. A driving axle structure, comprising a casing, a cage detachably mounted in the casing and reversible therein end-for-end, said cage having a lateral extension, shaft bearings carried by said extension with their axis transverse to and laterally offset from the axis of the casing, a driving shaft carried in said shaft bearings and extending across the plane which contains the axis of the casing and is perpendicular to the axis of said shaft bearings, differential gearing mounted in said cage, and worm gearing carried by and connecting said driving shaft and said differential gearing and meshing in the aforesaid plane.

2. A driving axle structure, comprising a casing, a cage detachably mounted in the casing, said cage having a lateral extension, shaft bearings carried by said extension with their axis transverse to and laterally offset from the axis of the casing, a driving shaft carried in said shaft bearings and extending across the plane which contains the axis of the casing and is perpendicular to the axis of said shaft bearings, differential gearing mounted in said cage, and worm gearing carried by and connecting said driving shaft and said differential gearing and meshing in the aforesaid plane.

3. In a driving axle structure, the combination of a pair of oppositely extending tubular casing members, shaft sections rotatably mounted in said tubular casing members, a central casing member formed at its ends for detachable engagement with either of the tubular members, said central casing member having a transverse perforation the axis of which is offset from the axis of the casing, a cage detachably mounted in the central casing member and having a lateral extension, said cage being reversible end-for-end in the casing, shaft bearings carried by the lateral extension of the cage with their axis in alinement with said transverse perforation, a driving shaft carried by said bearings and extending across the plane which contains the axis of the casing and is perpendicular to the axis of said shaft bearings, differential gearing mounted in said cage, and worm gearing carried by and connecting said driving shaft and said differential gearing and meshing in the aforesaid plane.

4. In a driving axle structure, the combination of a pair of oppositely extending tubular casing members, shaft sections rotatably mounted in said tubular casing members, a central casing member formed at its ends for detachable engagement with either of the tubular members, said central casing member having a transverse perforation the axis of which is offset from the axis of the casing, a cage detachably mounted in the central casing member and having a lateral extension, shaft bearings carried by the lateral extension of the cage with their axis in alinement with said transverse perforation, a driving shaft carried by said bearings and extending across the plane which contains the axis of the casing and is perpendicular to the axis of said shaft bearings, differential gearing mounted in said cage, and worm gearing carried by and connecting said driving shaft and said differential gearing and meshing in the aforesaid plane.

5. In a driving axle structure, the combination of a pair of oppositely extending tubular casing members, shaft sections rotatably mounted in said tubular casing members, a central casing member formed at its ends for detachable engagement with either of the tubular members, said central casing member having a transverse perforation the axis of which is offset from the axis of the casing, a cage detachably mounted in the central casing member and having a lateral extension, said cage being reversible end-for-end in the casing, shaft bearings carried by the lateral extension of the cage with their axis in alinement with said transverse perforation, a driving shaft carried by said bearings and extending across the plane which contains the axis of the casing and is perpendicular to the axis of said shaft bearings, differential gearing mounted in said cage, worm gearing carried by and connecting said driving shaft and said differential gearing and meshing in the aforesaid plane, a torque tube connected to the central casing member around its transverse perforation, and a propeller shaft mounted therein, said propeller shaft and driving shaft being connected together and axially separable.

6. In a driving axle structure, the combination of a pair of oppositely extending tubular casing members, shaft sections rotatably mounted in said tubular casing members, a central casing member formed at its ends for detachable engagement with either of the tubular members, said central casing member having a transverse perforation the axis of which is offset from the axis of the casing, a cage detachably mounted in the central casing member and having a lateral extension, shaft bearings carried by the lateral extension of the cage with their axis in alinement with said transverse perforation, a driving shaft carried by said bearings and extending across the plane which contains the axis of the casing and is perpendicular to the axis of said shaft bearings, differential gearing mounted in said cage, worm gearing carried by and connecting said driving shaft and said differential gearing and meshing in the aforesaid plane, a torque tube connected to the central casing member around its transverse perforation, a propeller shaft mounted therein, and an axially separable driving connection between said propeller shaft and said driving shaft.

7. A driving axle structure comprising a casing, a cage detachably mounted in the casing, said cage having a lateral extension, co-axial shaft bearings carried by said extension with their axis transverse to and laterally offset from the axis of the casing, one of said shaft bearings being located on each side of the plane which contains the axis of the casing and is perpendicular to the axis of said shaft bearings, a driving shaft carried in said shaft bearings and extending across such plane, differential gearing mounted in said cage, and a worm gearing carried by and connecting said driving shaft and said differential gearing and meshing in the aforesaid plane.

8. A driving axle structure, comprising a pair of oppositely extending tubular casing members, a central casing member formed at its ends for detachable engagement with said tubular casing members, shaft sections rotatably mounted within said casing members, said central casing member having a lateral opening, a cage detachably mounted in the central casing member and insertible and withdrawable by way of such lateral opening, said cage having a lateral extension and being reversible end-for-end in said central casing member, shaft bearings carried by said extension with their axis transverse to and laterally offset from the axis of the casing, a driving shaft mounted in said shaft bearings and extending across the plane which contains the axis of the casing and is perpendicular to the axis of such shaft bearings, differential gearing mounted in said cage, and worm gearing carried by and connecting said driving shaft and said differential gearing and meshing in the aforesaid plane.

9. A driving axle structure, comprising a pair of oppositely extending tubular casing members, a central casing member formed at its ends for detachable engagement with said tubular casing members, shaft sections rotatably mounted within said casing members, said central casing member having a lateral opening, a cage detachably mounted in the central casing member and insertible and withdrawable by way of such lateral opening, said cage having a lateral extension, shaft bearings carried by said extension with their axis transverse to and laterally offset from the axis of the casing, a driving shaft mounted in said shaft bearings and extending across the plane which contains the axis of the casing and is perpendicular to the axis of such shaft bearings, differential gearing mounted in said cage, and worm gearing carried by and connecting said driving shaft and said differential gearing and meshing in the aforesaid plane.

10. A driving axle structure, comprising a pair of oppositely extending tubular casing members, a central casing member formed at its ends for detachable engagement with said tubular casing members, shaft sections rotatably mounted within said casing members, said central casing member having a lateral opening, a cage detachably mounted in the central casing member and insertible and withdrawable by way of such lateral opening, said cage having a lateral extension, shaft bearings carried by said extension with their axis transverse to and laterally offset from the axis of the casing, a driving shaft mounted in said shaft bearings and extending across the plane which contains the axis of the casing and is perpendicular to the axis of such shaft bearings, differential gearing mounted in said cage, worm gearing carried by and connecting said driving shaft and said differential gearing and meshing in the aforesaid plane, a propeller shaft, and a separable connection between said propeller shaft and said driving shaft.

11. A driving axle structure, comprising an axle housing having a lateral opening therein; a cap normally closing said opening; driven shaft sections rotatably mounted in said axle housing; and a differential driving unit for driving said shaft sections, comprising a cage, a driving shaft journaled therein, a driving worm carried by said shaft, and worm gearing meshing with said worm and having driving connections with said shaft sections, the said differential driving unit being removably supported within said axle housing independently of said cap and being removable bodily through the opening closed by said cap.

12. A driving axle structure, comprising an axle housing, having a rearwardly facing opening therein; a cap normally closing said opening; driven shaft sections rotatably mounted in said axle housing; and a differential driving unit for driving said shaft sections, comprising a cage; a driving shaft journaled therein; a driving worm carried by said shaft; and worm gearing meshing with said worm and having driving connections with said shaft sections, the said differential driving unit being removably supported within said axle housing independently of said cap and being removable bodily through the opening closed by said cap.

13. A driving axle structure, comprising the combination of an axle housing; driven shaft sections rotatably mounted in said housing; and a differential driving unit having driving connections with said shaft sections and comprising a cage mounted in said housing; worm gearing carried thereby, a driving shaft journaled in said cage beneath said worm gearing, and a driving worm on said shaft meshing with said worm gearing, said differential driving unit, including said drive shaft and worm, being removable bodily from said housing.

14. In a driving axle structure, the combination of a pair of oppositely extending tubular casing members; shaft sections rotatably mounted in said tubular casing members; a central casing member formed at its ends for detachable engagement with either of the tubular members, said central casing member having a transverse perforation, the axis of which is offset from the axis of the casing; and a differential driving unit mounted therein and removable therefrom without disconnecting said axle structure from the vehicle frame, said unit comprising a cage detachably mounted in the central casing member and having a lateral extension; shaft bearings carried by the lateral extension of the cage with their axis in alinement with said transverse perforation; a driving shaft carried by said bearings and extending across the plane which contains the axis of the casing and is perpendicular to the axis of said shaft bearings; differential gearing mounted in said cage; and worm gearing carried by and connecting said driving shaft and said differential gearing and meshing in the aforesaid plane.

15. In a driving axle structure, the combination of a pair of oppositely extending tubular casing members; shaft sections rotatably mounted in said tubular casing members; a central casing member formed at its ends for detachable engagement with either of the tubular members, said central casing member having a transverse perforation, the axis of which is offset from the axis of the casing; a cage detachably mounted in the central casing member and having a lateral extension; shaft bearings carried by the lateral extension of the cage with their axis in alinement with said transverse perforation; a driving shaft carried by said bearings; differential gearing mounted in said cage; and worm gearing carried by and connecting said driving shaft and said differential gearing.

16. In a driving axle structure, the combination of an axle housing; shaft sections rotatably mounted therein; a differential driving unit connected with each of said shaft sections and comprising a cage removably supported within said housing and provided with a pair of alined bearings; a drive shaft journaled in said bearings, differential gearing mounted in said cage, worm gearing connecting said drive shaft and said differential gearing; a propeller shaft; and an axially separable connection between said propeller shaft and said drive shaft located adjacent one of said drive shaft bearings.

17. In a driving axle structure, the combination of an axle housing; shaft sections rotatably mounted therein; a cage supported in seats formed in said axle housing; releasable means for securing said cage in said seats; a drive shaft journaled in said cage and extending across the vertical plane containing the axis of said casing; differential gearing mounted in said cage and detachably connected with said shaft sections; a worm gear for driving said differential gearing; and a worm on said drive shaft meshing with said worm gear.

18. A driving axle structure, comprising a casing; and a differential driving unit mounted therein and removable therefrom without disconnecting said axle structure from the vehicle frame, said unit comprising a cage detachably mounted in the casing, said cage having a lateral extension, a driving shaft journaled in said extension and extending across the vertical plane which contains the axis of the casing, a differential gearing mounted in said cage, and worm gearing carried by and connecting said driving shaft and said differential gearing and meshing in the aforesaid plane.

19. A driving axle structure, comprising an axle housing, having a rearwardly facing opening therein; a cap normally closing said opening; driven shaft sections rotatably mounted in said axle housing; and a differential driving unit for driving said shaft sections, comprising a cage removably secured within said axle housing independently of said cap, differential gearing journaled in said cage and including a worm gear, said differential gearing being connected with said shaft sections, a driving shaft journaled in said cage, and a worm carried by said driving shaft and meshing with said worm gear, said differential driving unit being removable bodily through the opening closed by said cap.

20. In a driving axle structure, the combination of a pair of oppositely extending tubular casing members; shaft sections rotatably mounted therein; a central casing member connected at its ends to said tubular members, said central casing member having a transverse perforation, the axis of which is offset from the axis of the casing; a cage detachably mounted in the central casing member and having a lateral extension; shaft bearings carried by the lateral extension of the cage with their axis in alinement with said transverse perforation; a driving shaft carried by said bearings and extending across the plane which contains the axis of the casing and is perpendicular to the axis of said shaft bearings; differential gearing mounted in said cage; and worm gearing carried by and connecting said driving shaft and said differential gearing and meshing in the aforesaid plane.

21. A driving axle structure, comprising a casing and a differential driving unit mounted therein and removable therefrom without disconnecting said axle structure from the vehicle frame, said unit comprising a cage detachably mounted in the casing, said cage having a lateral extension; shaft bearings carried by said extension with their axis transverse to and laterally offset from the axis of the casing; a driving shaft carried in said shaft bearings and extending across the plane which contains the axis of the casing and is perpendicular to the axis of said shaft bearings; a differential gearing mounted in said cage; and worm gearing, carried by and connecting said driving shaft and said differential gearing, meshing in the aforesaid plane.

22. A driving axle structure, comprising a casing and a differential driving unit mounted therein and removable therefrom without disconnecting said casing from the vehicle frame to which it is attached, said unit comprising a cage detachably mounted in the casing, said cage having a lateral extension; co-axial shaft bearings carried by said extension with their axis transverse to and laterally offset from the axis of the casing, one of said shaft bearings being located on each side of the plane which contains the axis of the casing and is perpendicular to the axis of said shaft bearings; a driving shaft carried in said shaft bearings and extending across such plane; differential gearing mounted in said cage; and a worm gearing carried by and connecting said driving shaft and said differential gearing and meshing in the aforesaid plane.

23. A driving axle structure, comprising the combination of a casing; a cage detachably mounted in said casing; differential gearing mounted in said cage; shaft bearings carried by said cage, with their axis transverse to and laterally offset from the axis of the casing; a driving shaft carried in said shaft bearings and extending across the plane which contains the axis of the casing and is perpendicular to the axis of said shaft bearings; a worm on said shaft; said shaft bearings comprising anti-friction means for taking both the load and thrust located on each side of said worm; and a worm gear carried by said differential gearing and meshing with said worm.

24. A driving axle structure, comprising the combination of a casing; a cage detachably mounted in said casing; differential gearing mounted in said cage; shaft bearings carried by said cage, with their axis transverse to and laterally offset from the axis of the casing; a driving shaft carried in said shaft bearings and extending across the plane which contains the axis of the casing and is perpendicular to the axis of said shaft bearings; a worm on said shaft; said shaft bearings including thrust bearings disposed on opposite sides of said worm; and a worm gear carried by said differential gearing and meshing with said worm.

25. A driving axle structure, comprising the combination of a casing; a cage detachably mounted in said casing; differential gearing mounted in said cage; shaft bearings carried by said cage, with their axis transverse to and laterally offset from the axis of the casing; a driving shaft carried in said shaft bearings and extending across the plane which contains the axis of the casing and is perpendicular to the axis of said shaft bearings; a worm on said shaft; said shaft bearings including anti-friction bearings, located on opposite sides of said worm, for taking the thrust in opposite directions; and a worm gear carried by said differential gearing and meshing with said worm.

26. A driving axle structure, comprising the combination of a a casing; shaft sections rotatably mounted in said casing; a cage detachably mounted in the casing, said cage having a lateral extension; shaft bearings carried by said extension, with their axis transverse to and laterally offset from the axis of the casing; a driving shaft carried in said shaft bearings and extending across the plane which contains the axis of the casing and is perpendicular to the axis of said shaft bearings; differential gearing mounted in said cage; driving connections between said shaft sections and said differential gearing, permitting transverse withdrawal of said differential gearing without axial movement of the shaft sections; and worm gearing carried by and connecting said driving shaft and said differential gearing and meshing in the aforesaid plane.

27. A driving axle structure, comprising the combination of a casing; shaft sections rotatably mounted in said casing; a cage detachably mounted in the casing, said cage having a lateral extension; co-axial shaft bearings carried by said extension, with their axis transverse to and laterally offset from the axis of the casing, one of said shaft bearings being located on each side of the plane which contains the axis of the casing and is perpendicular to the axis of said shaft bearings; a driving shaft carried in said shaft bearings and extending across said plane; differential gearing mounted in said cage; driving connections between said shaft sections and said differential gearing, permitting transverse withdrawal of the differential gearing without axial movement of the shaft sections; and worm gearing carried by and connecting said driving shaft and said differential gearing and meshing in the aforesaid plane.

28. A driving axle structure, comprising the combination of an axle housing having a lateral opening therein; a cap normally closing said opening; driven shaft sections rotatably mounted in said axle housing; and a differential driving unit for driving said shaft sections, comprising a cage, a driving shaft journaled therein, a driving worm carried by said shaft and a worm gear meshing with said worm and having driving connections with said shaft sections, permitting transverse withdrawal of said differential driving unit without axial movement of the shaft sections, the said differential driving unit being removably supported within said axle housing independently of said cap and being removable bodily through the opening closed by said cap.

29. A driving axle structure, comprising the combination of a casing and a differential driving unit mounted therein and removable therefrom without disconnecting said axle structure from the vehicle frame, said unit comprising a cage detachably mounted in the casing, said cage having a lateral extension; shaft bearings carried by said extensions with their axis transverse to and laterally offset from the axis of the casing; a driving shaft carried in said shaft bearings and extending across the plane which contains the axis of the casing and is perpendicular to the axis of said shaft bearings; a differential gearing mounted in said cage; and worm gearing carried by and connecting said driving shaft and said differential gearing and meshing in the aforesaid plane, said cage being made up of a plurality of parts separable in a plane containing the axis of said differential gearing.

30. A driving axle structure, comprising the combination of a casing and a differential driving unit mounted therein and removable therefrom without disconnecting said axle structure from the vehicle frame, said unit comprising a cage detachably mounted in the casing, said cage having a lateral extension; shaft bearings carried by said extension with their axis transverse to and laterally offset from the axis of the casing; a driving shaft carried in said shaft bearings and extending across the plane which contains the axis of the casing and is perpendicular to the axis of said shaft bearings; a differential gearing mounted in said cage and provided with axially extending hubs, said cage including separable mating members embracing said hubs; and worm gearing carried by and connecting said driving shaft and said differential gearing.

31. A driving axle structure, comprising the combination of a casing; a cage detachably mounted in the casing, said cage having a lateral extension; shaft bearings carried by said extension, with their axis transverse to and laterally offset from the axis of the casing; a driving shaft carried in said shaft bearings and extending across the plane which contains the axis of the casing and is perpendicular to the axis of said shaft bearings; said casing comprising a plurality of parts adapted to be drawn together to position said shaft bearings; differential gearing mounted in said cage; and worm gearing carried by and connecting said driving shaft and said differential gearing and meshing in the aforesaid plane.

32. A driving axle structure, comprising the combination of a casing; a cage detachably mounted in the casing, said cage having a lateral extension; shaft bearings carried by said extension, with their axis transverse to and laterally offset from the axis of the casing; a driving shaft carried in said shaft bearings and extending across the plane which contains the axis of the casing and is perpendicular to the axis of said shaft bearings; differential gearing mounted in said cage; a worm gear carried by said differential gearing; a worm splined on said driving shaft and meshing with said worm gear.

33. A driving axle structure, comprising the combination of a casing; a cage detachably mounted in the casing, said cage having a lateral extension; shaft bearings carried by said extension, with their axis transverse to and laterally offset from the axis of the casing; a driving shaft carried in said shaft bearings and extending across the plane which contains the axis of the casing and is perpendicular to the axis of said shaft bearings; differential gearing mounted in said cage; a worm gear carried by said differential gearing; and a worm splined on said driving shaft and reversible thereon end for end and meshing with said worm gear.

In witness whereof I hereunto set my hand this 3d day of July, 1917.

THOMAS J. LINDSAY.

Witnesses:

LOUISE BENNETT,
G. B. SCHLEY.

Correction in Reissue Letters Patent No. 14,398.

It is hereby certified that in Reissue Letters Patent No. 14,398, granted November 27, 1917, upon the application of Thomas J. Lindsay, of Indianapolis, Indiana, for an improvement in "Worm-Drive Axle Structures," an error appears in the printed specification requiring correction as follows: Page 1, line 89, for the word "driven" read *driving;* and that the said Letters Patent should be read with this correction therein that the same may conform to the record of the case in the Patent Office.

Signed and sealed this 29th day of January, A. D., 1918.

[SELA.]

R. F. WHITEHEAD,

*Acting Commissioner of Patents.*

Cl. 74—99.